United States Patent
Yuan

(10) Patent No.: US 11,016,839 B2
(45) Date of Patent: May 25, 2021

(54) SYSTEM AND METHOD FOR PROCESSING STORAGE DEVICE ABNORMALLY POWERED DOWN

(71) Applicant: ADATA TECHNOLOGY CO., LTD., New Taipei (TW)

(72) Inventor: Kuo-Hua Yuan, Hsinchu (TW)

(73) Assignee: ADATA TECHNOLOGY CO., LTD., New Taipei (TW)

( * ) Notice: Subject to any disclaimer, the term of this patent is extended or adjusted under 35 U.S.C. 154(b) by 99 days.

(21) Appl. No.: 16/198,808

(22) Filed: Nov. 22, 2018

(65) Prior Publication Data
US 2020/0073750 A1 Mar. 5, 2020

(30) Foreign Application Priority Data
Aug. 31, 2018 (TW) ................................. 107130620

(51) Int. Cl.
*G06F 11/22* (2006.01)
*G06F 11/07* (2006.01)
(Continued)

(52) U.S. Cl.
CPC ........ *G06F 11/0793* (2013.01); *G06F 11/073* (2013.01); *G06F 11/0751* (2013.01);
(Continued)

(58) Field of Classification Search
CPC ............. G06F 11/1048; G06F 11/1056; G06F 11/106; G06F 11/1068; G06F 11/1435;
(Continued)

(56) References Cited

U.S. PATENT DOCUMENTS

| 5,379,417 A * | 1/1995 | Lui | ...................... G06F 11/1076 706/916 |
| 2004/0103238 A1* | 5/2004 | Avraham | ............ G06F 11/1441 711/102 |

(Continued)

FOREIGN PATENT DOCUMENTS

| CN | 101604548 A | 12/2009 |
| CN | 101963891 A | 2/2011 |

(Continued)

*Primary Examiner* — Joseph O Schell
(74) *Attorney, Agent, or Firm* — Li & Cai Intellectual Property (USA) Office

(57) ABSTRACT

A system and a method for processing storage device occurring abnormal power interruption are provided. The method includes the following steps: (a) providing data to the storage device by a master controller; (b) outputting an address storing instruction from the master controller; (c) storing an address of a storage block in an address storage; (d) executing a program for accessing the data by the storage device; (e) determining whether the storage device is abnormally powered down by the master controller, if yes, performing step (f), and if not, performing step (g) after completing the execution of the program; (f) instructing an storage control circuit of the storage device to execute an error processing procedure on the storage block corresponding to the address by the master controller, and then performing step (a); (g) clearing the address stored in the address storage according to an instruction from the master controller.

6 Claims, 5 Drawing Sheets

(51) Int. Cl.
*G06F 11/10* (2006.01)
*G06F 11/14* (2006.01)
(52) U.S. Cl.
CPC ...... *G06F 11/1056* (2013.01); *G06F 11/1068* (2013.01); *G06F 11/1441* (2013.01); *G06F 2212/1032* (2013.01)
(58) Field of Classification Search
CPC ............ G06F 11/1438; G06F 11/1441; G06F 2212/1032; G06F 3/0655; G06F 3/0659
See application file for complete search history.

(56) References Cited

U.S. PATENT DOCUMENTS

| | | | | |
|---|---|---|---|---|
| 2005/0083804 | A1* | 4/2005 | Hwang | G11B 20/1883 369/47.22 |
| 2009/0228634 | A1* | 9/2009 | Nakamura | G06F 11/1441 711/103 |
| 2010/0153773 | A1* | 6/2010 | Koester | G11B 27/36 714/5.1 |
| 2014/0281151 | A1 | 9/2014 | Yu et al. | |
| 2015/0006815 | A1* | 1/2015 | Madhusudana | G06F 11/1441 711/114 |
| 2015/0347289 | A1* | 12/2015 | Ma | G06F 12/0246 711/103 |
| 2015/0370702 | A1* | 12/2015 | Voigt | G06F 11/2094 711/2 |
| 2017/0083254 | A1* | 3/2017 | Benoit | G06F 3/0622 |
| 2018/0032272 | A1* | 2/2018 | Sato | G06F 12/0638 |
| 2019/0243732 | A1* | 8/2019 | Tati | G06F 11/1471 |

FOREIGN PATENT DOCUMENTS

| | | |
|---|---|---|
| CN | 103488578 A | 1/2014 |
| CN | 103995578 B | 10/2017 |

\* cited by examiner

SYSTEM AND METHOD FOR PROCESSING STORAGE DEVICE ABNORMALLY POWERED DOWN

CROSS-REFERENCE TO RELATED PATENT APPLICATION

This application claims the benefit of priority to Taiwan Patent Application No. 107130620, filed on Aug. 31, 2018. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure involves to a storage device, and more particularly to a system and a method for processing storage device occurring abnormal power interruption.

BACKGROUND OF THE DISCLOSURE

Data storage technologies of solid state drives (SSD) have been developed rapidly over the past decade. The solid state drives have gradually replaced the conventional magnetic recording hard disk drives (HDDs) in many applications. In comparison with the conventional hard disk storage systems, the solid state drives have significant differences in power loss protection. The solid state drives contain more complex metadata and data caches, so data must be completely written to memory cells to ensure integrity of the metadata and user data. For enterprise applications, it is important to ensure that the solid state drives function properly, and all of the data written to the memory cells must be read correctly after the solid state drives are powered down and then back on.

SUMMARY OF THE DISCLOSURE

In response to the above-referenced technical inadequacies, the present disclosure provides a system for processing one or more storage devices occurring abnormal power interruption. Each of the storage devices includes a plurality of storage blocks and a storage control circuit connected to the storage blocks. The system includes a main controller and an address storage. The main controller is connected to the storage control circuits. The main controller is configured to provide data to the storage control circuit and output an address storing instruction, then output a programmable instruction for instructing the storage control circuit to control the storage block to execute a program that includes accessing the data. The main controller is configured to output an address clearing instruction after executing the program. The address storage is connected to the main controller. The address storage is configured to store an address of the storage block of the storage device to be instructed to execute the program, and clear the address according to the address clearing instruction. When the storage device is abnormally powered down during the execution of the program, and powered back on and rebooted after a period of time, the main controller reads the address storage and determines which one of the storage blocks that executes the program according to the address to indicate the storage control circuit to execute an error processing procedure on the storage block. The present disclosure provides a method for processing one or more storage devices occurring abnormal power interruption. Each of the storage devices includes a plurality of storage blocks and a storage control circuit connected to the storage blocks. The method includes the following steps: (a) providing data to the storage control circuit by the main controller; (b) outputting an address storing instruction to an address storage from the main controller; (c) storing an address of the storage block of the storage device to be instructed to execute a program according to the address storing instruction in the address storage; (d) outputting a programmable instruction for instructing the storage control circuit to control the storage block to execute a program that includes accessing the data by the main controller; (e) determining whether the storage device is powered down or not when the storage device performs the program by the main controller, in response to determine that the storage device is powered down, performing steps (f) to (g), in response to determine that the storage device is not powered down, completing the execution of the program, and then performing steps (h) to (i); (f) obtaining the address from the address storage and determining which one of the storage blocks that performs the program according to the address by the main controller; (g) when determining that the storage device is powered back on and rebooted after a period of time, instructing the storage control circuit to execute an error processing procedure on the storage block by the main controller, and then returning to perform the step (a) again; (h) outputting an address clearing instruction to the address storage after completing the execution of the program; and (i) clearing the address stored in the address storage according to the address clearing instruction.

As described in above, the present disclosure provides the system and the method for processing the storage devices occurring the abnormal power interruption, if the storage device is abnormally powered down such that the storage block is damaged into the bad block, the bad block can be repaired back to the normal storage block in real time, so as to avoid the storage block damaged for a long time from affecting an overall operation of the storage device with more serious damage to the storage device.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
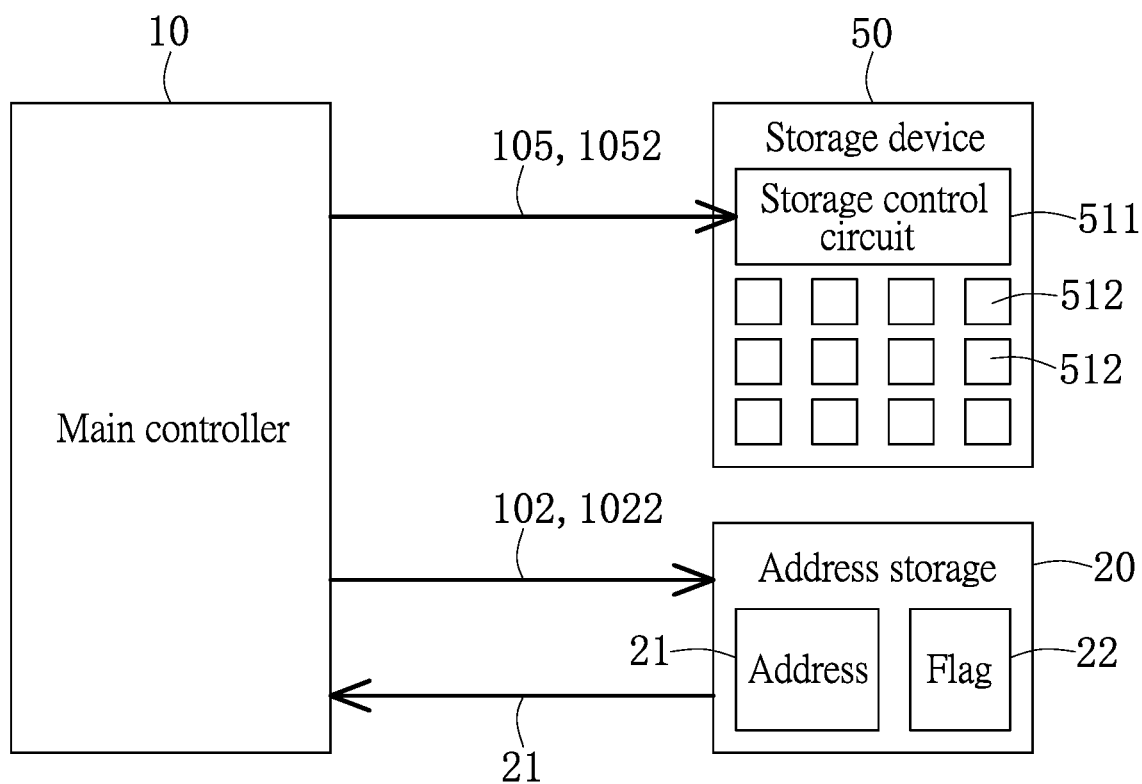
FIG. 1 is a block diagram of a system for processing storage device occurring abnormal power interruption according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Reference is made to FIG. 1, which is a block diagram of a system for processing storage device occurring abnormal power interruption according to a first embodiment of the present disclosure. As shown in FIG. 1, the system for processing a storage device 50 occurring abnormal power interruption includes a main controller 10 and an address storage 20. The main controller 10 is connected to the address storage 20 and the storage device 50.

For example, the main controller 10 may be a controller for a solid state hard disk. The address storage 20 may be a flash memory such as a flash memory having a serial peripheral interface (SPI), or other storage device having a function of temporarily or permanently storing data. The storage device 50 may be a NAND or NOR flash memory device, or other storage device having a storage function, but the present disclosure is not limited thereto.

The storage device 50 includes a storage control circuit 511 and a plurality of storage blocks 512. The storage blocks 512 may be memory cells. In the embodiment, the storage device 50 includes twelve storage blocks 512, which are arranged in an array with three rows and four columns. It should be understood that the type of the storage device 50 and the number and arrangement of the storage blocks 512 included therein, and the amount of data that the storage device 50 can access may be adjusted according to actual requirements.

The main controller 10 provides new data 105 to the storage device 50. The new data 105 may be 1-bit data or a data stream including bits. The main controller 10 may output an address storing instruction 102 to the address storage 20 at the same time as or subsequent to the provision of the new data 105 to indicate the address storage 20 to store an address 21 of the storage block 512 of the storage device 50, wherein the storage block 512 is to be instructed to execute a program, for example, accessing the new data 105. The address 21 may correspond to a row/column location of the storage block 512 in the array.

Alternatively, the storage blocks 512 of the storage device 50 may store the same or different new data 105 simultaneously or sequentially. Address storage blocks of the address storage 20 may store the addresses 21 corresponding to the storage blocks 512 to be instructed to access the new data 105 or execute other programs respectively.

In addition, the address storage 20 may set one or more flags 22 corresponding to one or more addresses 21 of one or more storage blocks 512 of the storage device 50 according to the address storing instruction 102 from the main controller 10. For example, the flag 22 may include a status flag, a control flag, etc., or a combination thereof. The flag 22 may indicate a storage state of the address 21 of the storage block 512, for example, indicating whether the address 21 of the storage block 512 is still stored in the address storage 20, and indicating that the address 21 of the storage block 512 is stored in which one of the address storage block in the address storage 20 and the address 21 of the one address storage block.

After confirming that the address 21 of the storage block 512 is stored in the address storage 20, the main controller 10 may output a programmable instruction 1052. When the storage control circuit 511 of the storage device 50 receives the programmable instruction 1052, the storage control circuit 511 may program the storage block 512 of the storage device 50 according to the programmable instruction 1052 from the main controller 10. That is, the storage control circuit 511 controls the storage block 512 to execute the program, for example, the storage block 512 reads the new data 105 received from the main controller 10, and then writes the new data 105 therein. Optionally, the storage control circuit 511 erases original data stored in the storage block 512 before accessing the new data 105.

When the main controller 10 determines that the storage device 50 has completed the execution of the program such as the accessing operation of the new data 105, the main controller 10 may output an address clearing instruction 1022 to the address storage 20 to instruct the address storage 20 to clear the address 21 and the flag 22 of the storage block 512 according to the address clearing instruction 1022.

In an ideal situation, power is normally supplied to the storage device 50 during the execution of the data accessing operation or other programs. Therefore, after completing the above operations or other programs, it only needs to clear the address 21 and the flag 22 of the storage block 512 of the storage device 50.

However, it is worth noting that the storage device 50 may be abnormally powered down during the execution of the programs, resulting in damage to the storage device 50. In this case, it is not known which one of the storage blocks 512 of the storage device 50 is being programmed when the storage device 50 is abnormally powered down. As a result, it takes a considerable amount of time to execute an error processing procedure on the storage block 512, and many problems may be derived therefrom.

Therefore, in the embodiment, before the main controller 10 instructs the storage control circuit 511 of the storage device 50 to program the storage block 512, the main controller 10 instructs the address storage 20 to store the address 21 and the flag 22 of the storage block 512 to be instructed to execute the program. As such, an appropriate process can be performed in real time, when an abnormality occurs in a power source of the storage device 50, for example, the power is stopped supplying to the storage device such that the storage device is abnormally powered down to stop executing the program, which causes that the storage block 512 of the storage device 50 accesses error data or is damaged.

More specifically, when the main controller 10 detects that the storage device 50 is abnormally powered down, the main controller 10 may read whether the address storage 20 stores the address 21 to determine an execution state of the program when the abnormal power interruption occurs, and determine which one of the storage blocks 512 that is performing the program when the storage device is abnormally powered down.

If the main controller 10 detects that the address 21 is still stored in the address storage 20 after the abnormal power interruption occurs, the main controller 10 determines that the storage device 50 is executing the program when the abnormal power interruption occurs. In this case, when the storage device 50 is powered back on and rebooted after a period of time, the main controller 10 may immediately instruct the storage control circuit 511 of the storage device 50 to execute an error processing procedure 1054 on the storage block 512 of the storage device 50 that corresponds the address 21 stored in the address storage 20.

The abnormal power interruption condition may cause the normal storage block 512 that is storing the new data 105 to become an abnormal bad block. Therefore, the main controller 10 instructs the storage device 50 to execute the error processing procedure 1054, for example, the main controller 10 erases the incomplete data stored in the storage block 512 and even clears the original data stored in the storage block 512 together. Repairing the damaged storage block 512 immediately after the abnormal power interruption can prevent the storage device 50 from being deteriorated, and then can use the storage block 512 to access data or execute other programs.

However, if the storage device 50 is powered down for a long time (i.e. a time required for restoring power supply is too long) or too many times, it may cause serious damage to the storage blocks 512 of the storage device 50. As a result, it may be impossible to execute the error processing procedure 1054 only on the single storage block 512 to repair the storage device 50. In this condition, the main controller 10 instructs the storage device 50 to execute the corresponding error processing procedure 1054. For example, the main controller 10 formats the storage device 50 to clear the data stored in all of the storage blocks 512 of the storage device 50, wherein the data includes the incomplete new data 105.

Conversely, when the main controller 10 reads the address storage 20 after the storage device 50 is powered down to find that the address storage 20 does not store the flag 22, the main controller 10 determines that the storage device 50 has completed the execution of the program when or before occurring abnormal power interruption. In this case, the main controller 10 does not need to execute the error processing procedure 1054.

Second Embodiment

Figure 2:
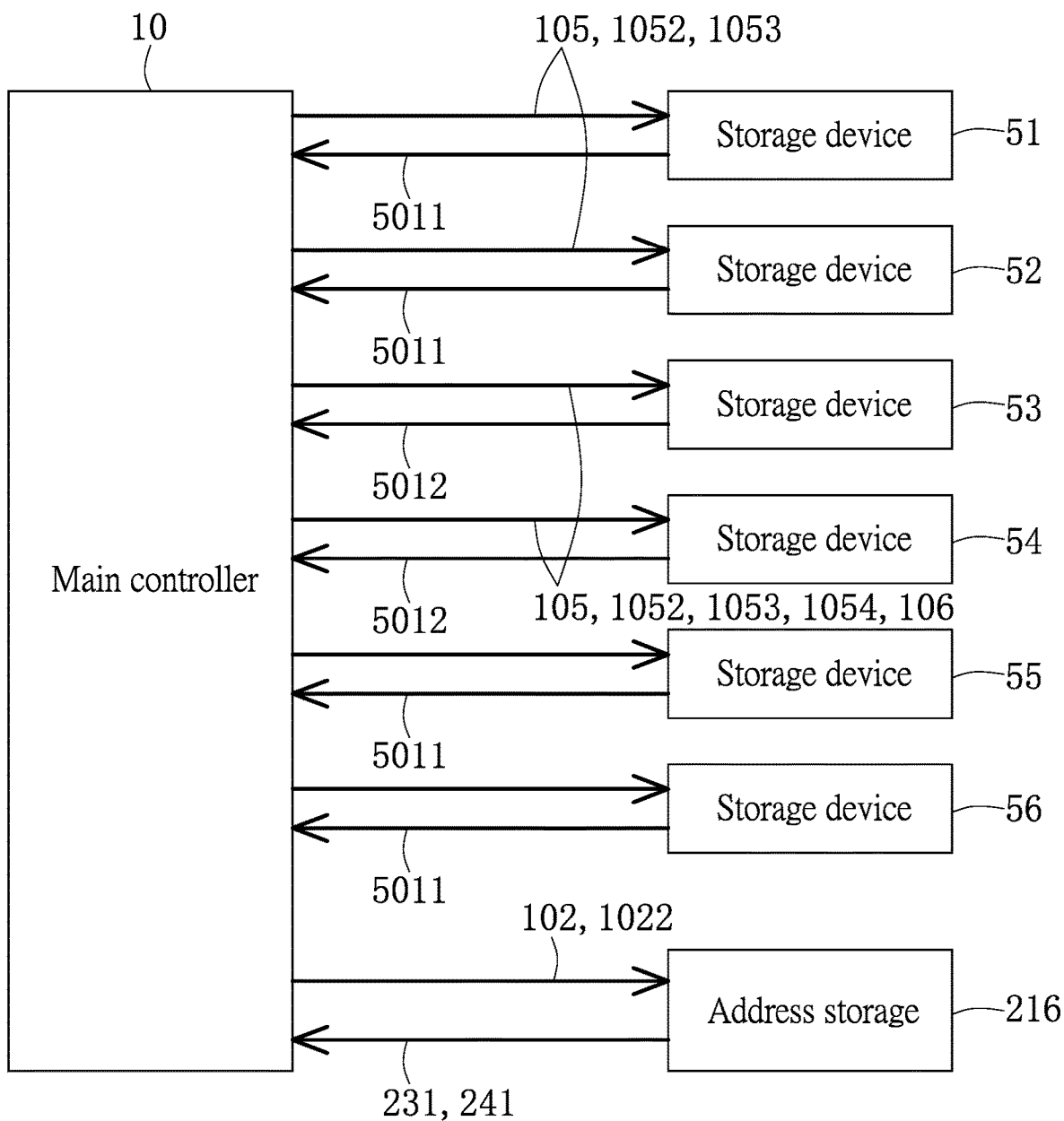
FIG. 2 is a block diagram of a system for processing storage device occurring abnormal power interruption according to a second embodiment of the present disclosure.

Reference is made to FIG. 2, which is a block diagram of a system for processing storage device occurring abnormal power interruption according to a second embodiment of the present disclosure. As shown in FIG. 2, the system for processing storage devices 51 to 56 that may occur abnormal power interruption includes the main controller 10 and the address storage 20. The main controller 10 is connected to the address storage 20 and the storage devices 51 to 56.

In the embodiment, the six storage devices 51 to 56 are disposed, which may be synchronously or asynchronously controlled by the main controller 10. The storage devices 51 to 56 may be expanded or reduced according to actual requirements, but the numbers of which are not limited by the present disclosure. All of the storage devices 51 to 56 may receive power from a common power source or different power sources as in the embodiment.

The main controller 10 may selectively provide the data 105 to one or more of the storage devices 51 to 56, for example, the data 105 is only provided to the storage devices 52 and 53, or to each of the storage devices 51 to 56 as in the embodiment. The main controller 10 may then output the programmable instruction 1052 for instructing the storage devices 51 to 56 to execute the programs, for example, accessing the data 105.

The main controller 10 may continuously or intermittently output power detecting signals 1053 to the storage devices 51 to 56 that are executing the programs. For example, the power is normally supplied to the storage devices 51, 52, 55 and 56 during the execution of the program such that the storage blocks of the storage devices 51, 52, 55 and 56 can correctly execute the programs. In this condition, the storage devices 51 to 56 are not abnormally powered down, and accordingly, the storage control circuit of each of the storage devices 51 to 56 responses a normal power signal 5011 to the main controller 10. When the main controller 10 receives the normal power signals 5011 indicating that the storage devices 51, 52, 55 and 56 are all normal during the execution of the programs, the main controller 10 determines that the error processing procedures 1054 are not required to be executed thereto.

It should be noted that, when the storage control circuits of the storage devices 53 and 54 determines that the storage devices 53 and 54 are abnormally powered down during the execution of the programs and then powered back on, each of the storage control circuits of the storage devices 53 and 54 responses an abnormal power signal 5012 to the main controller 10.

The main controller 10 determines that the storage devices 53 and 54 are abnormally powered down according to the abnormal power signals 5012. The main controller 10 indicates the storage control circuits of the storage devices 53 and 54 to execute the error processing procedures 1054 on the storage blocks of the storage devices 53 and 54, according to damage degrees of the storage blocks performing the programs that are indicated by the abnormal power signals 5012, to repair the damaged storage blocks and the accessed incompletely data.

After the storage blocks of the storage devices 53 and 54 are repaired, the main controller 10 may provide update data 106 to the storage control circuits 511, and instruct the storage devices 53 and 54 to access the update data 106 to update the storage blocks. The above update data 106 may be the same as the data 105, or only a portion of the data 105 that is not accessed yet or is accessed incorrectly.

Third Embodiment

Figure 3:
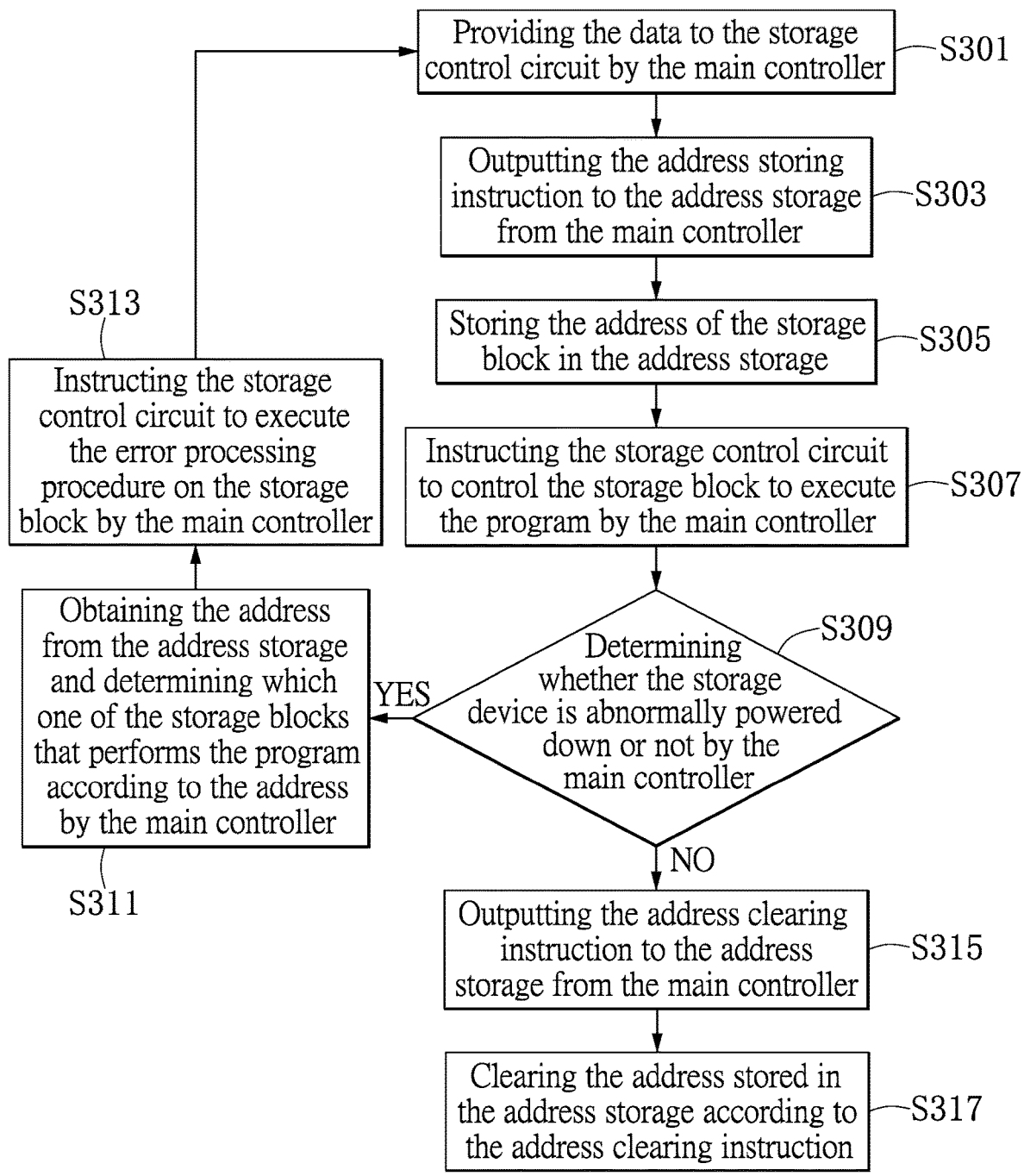
FIG. 3 is a flowchart of a method for processing storage device occurring abnormal power interruption according to a third embodiment of the present disclosure.

Reference is made to FIG. 3, which is a flowchart of a method for processing storage device occurring abnormal power interruption according to a third embodiment of the present disclosure. As shown in FIG. 3, in the embodiment, the method for processing storage device occurring abnormal power interruption includes the following steps S301 to S317 for the above system. The system includes the main controller and the address storage connected to each other. The storage device includes the storage control circuit and the storage blocks connected to each other.

In step S301, the main controller of the system provides the data to the storage control circuit of the storage device.

In step S303, the main controller of the system outputs the address storing instruction to the address storage.

In step S305, the address storage of the system stores the address of the storage block of the storage device to be instructed to perform the program according to the address storing instruction.

In step S307, the main controller of the system outputs the programmable instruction for instructing the storage control circuit of the storage device to control the storage block of the storage device to perform the program, for example, accessing the data.

In step S309, the main controller of the system determines whether the storage device is abnormally powered down when the storage device performs the program. If the storage device is abnormally powered down, step S311 is performed. Conversely, the storage device is not abnormally powered down, the storage device remains to perform the program, and after completing the execution of the program, steps S313 to S315 are sequentially performed.

In step S311, the main controller of the system obtains the address from the address storage of the system, and determines which one of the storage blocks of the storage device that performs the program when the storage device is abnormally powered down according to the address.

In step S313, when the storage device is powered back on and rebooted after a period of time, the main controller of the system instructs the storage control circuit of the storage device to execute the error processing procedure on the storage block that performs the program when the storage device is abnormally powered down, and then step S301 is performed again.

In step S315, after the storage device completes the execution of the program, the main controller of the system outputs the address clearing instruction to the address storage of the system.

In step S317, the address storage of the system clears the stored address of the storage block that has completed the execution of the program according to the address clearing instruction.

Fourth Embodiment

Figure 4:
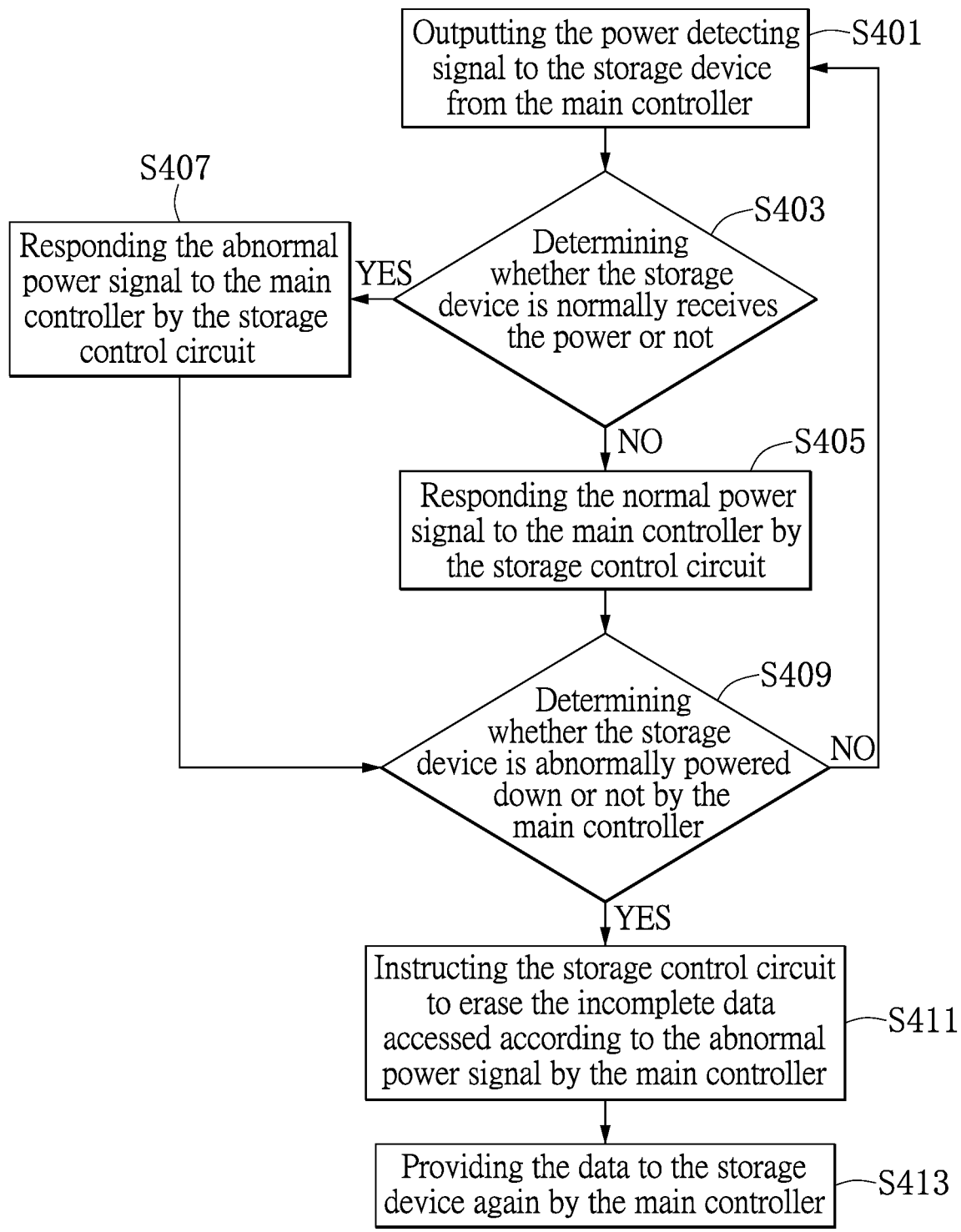
FIG. 4 is a flowchart of a method for processing storage device occurring abnormal power interruption according to a fourth embodiment of the present disclosure.

Reference is made to FIG. 4, which is a flowchart of a method for processing storage device occurring abnormal power interruption according to a fourth embodiment of the present disclosure. As shown in FIG. 4, the method for processing storage device occurring abnormal power interruption includes the following steps S401 to S413, which may be appropriately combined with one or more of the above steps S301 to S317 in the third embodiment. Steps S401 to S407 further exemplify how to use the main controller to determine whether the storage device is abnormally powered down for step S309 in the third embodiment. Step S411 further exemplifies the error processing procedure performed in step S313.

In step S401, the main controller of the system for processing the storage device occurring abnormal power interruption outputs the power detecting signal to the storage control circuit of the storage device.

In step S403, the storage control circuit of the storage device determines whether the storage device receives the power normally. If the storage device does not receive the power normally, step S405 is performed. If the storage device receives the power normally, step S407 is performed.

In step S405, when the storage device is not abnormally powered down, the storage control circuit of the storage device responses the normal power signal to the main controller of the system.

In step S407, after the storage device is abnormally powered down and then back on, the storage control circuit of the storage device responses the abnormal power signal to the main controller.

In step S409, the main controller of the system determines whether the storage device is abnormally powered down when performing the program, for example, accessing the data provided by the main controller, according to the received normal power signal or abnormal power signal. If the storage device is not abnormally powered down, remaining to detect the power supply state in step S401. If the storage device is abnormally powered down, step S411 is performed.

In step S411, the main controller of the system instructs the storage control circuit of the storage device to erase the incomplete data stored in the storage block of the storage device according to abnormal power signal.

In step S413, the main controller of the system provides the data to the storage control circuit again, and the storage control circuit of the storage device controls the storage block of the storage device to access the data again.

It should be understood that, if the main controller determines that a portion of data has correctly stored when the abnormal power interruption occurs, only the stored error data is erased in step S411. Next, in step S413, the main controller may provide only the remaining data that is not stored yet to the storage block of the storage device to store the remaining data in the storage block. However, if the abnormal power interruption causes damage to the entire storage block, the main controller may provide original data stored in the storage block and the new data to be stored in this storage operation to the storage block of the storage device to store the original data and the new data in the storage block of the storage device.

Fifth Embodiment

Figure 5:
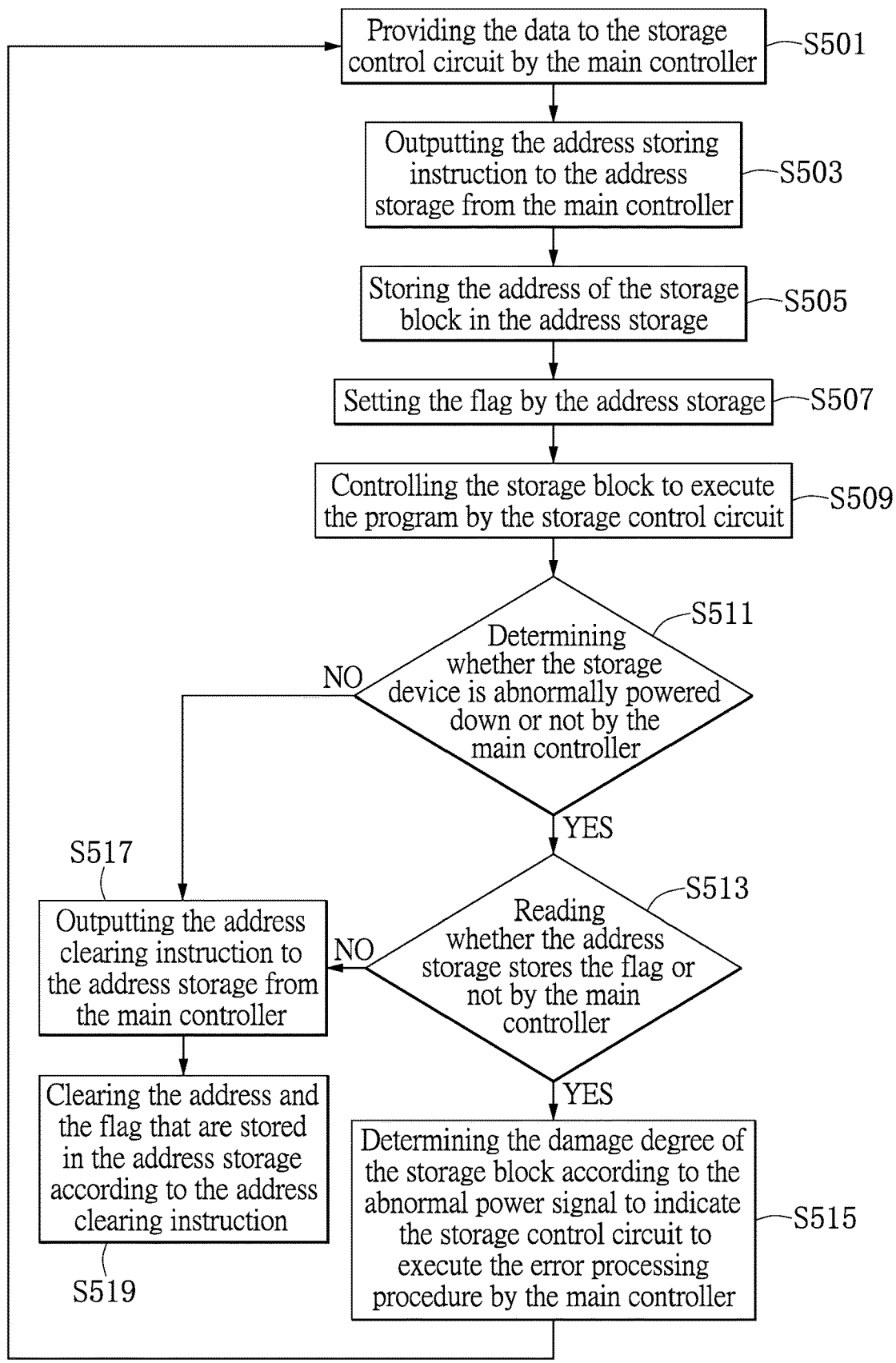
FIG. 5 is a flowchart of a method for processing storage device occurring abnormal power interruption according to a fifth embodiment of the present disclosure.

Reference is made to FIG. 5, which is a flowchart of a method for processing storage device occurring abnormal power interruption according to a fifth embodiment of the present disclosure. As shown in FIG. 5, in the embodiment, the method for processing storage device occurring abnormal power interruption includes the following steps S501 to S519 for the above system. The system includes the main controller and the address storage connected to each other. The storage device includes the storage control circuit and the storage blocks connected to each other.

In step S501, the main controller of the system provides the data to the storage control circuit of the storage device.

In step S503, the main controller of the system outputs the address storing instruction to the address storage.

In step S505, the address storage of the system stores the address of the storage block of the storage device to be instructed to perform the program according to the address storing instruction from the main controller.

In step S507, the address storage of the system sets the flag corresponding to the address of the storage block of the storage device to be instructed to perform the program according to the address storing instruction from the main controller.

In step S509, the main controller of the system outputs the programmable instruction for instructing the storage control circuit of the storage device to control the storage block of the storage device to perform the program, for example, accessing the data.

In step S511, the main controller of the system determines whether the storage device is abnormally powered down when the storage device performs the program. If the storage device is abnormally powered down, step S513 is performed. Conversely, the storage device is not abnormally powered down, steps S517 to S519 are sequentially performed.

In step S513, the main controller reads whether the address storage stores the flag. If the address storage stores the flag, step S515 is performed. If the address storage does not store the flag, step S517 to S519 are performed.

In step S515, the main controller determines the damage degree of the storage block of the storage device according to the received abnormal power signal, to indicate the storage control circuit of the storage device to execute the corresponding error processing procedure on the storage block. After the error processing procedure is completed, for example, erasing the data stored in the storage block, returning to perform step 501, in which the main controller provides the data again.

In step S517, the main controller of the system outputs the address clearing instruction to the address storage of the system.

In step S519, the address storage of the system clears the stored address and flag of the storage block that has completed the execution of the program.

The present disclosure provides the system and the method for processing the storage devices occurring the abnormal power interruption, beneficial effects of which are that, if the storage device is abnormally powered down such that the storage block is damaged into the bad block, the bad block can be repaired back to the normal storage block in real time, so as to avoid the storage block damaged for a long time from affecting an overall operation of the storage device with more serious damage to the storage device.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A system for processing a storage device that was abnormally powered down, the storage device includes a plurality of memory cells and a storage control circuit connected to the memory cells, the memory cells are arranged in an array with three rows and four columns, the system comprising:
   a main controller connected to the storage control circuits, the main controller is configured to provide data to the storage control circuit and output an address storing instruction, then output a programmable instruction for instructing the storage control circuit to control one of the plurality of memory cells to execute a program that includes accessing the data, and output an address clearing instruction after executing the program; and
   an address storage connected to the main controller, the address storage has a plurality of address storage blocks, wherein one of the address storage blocks is configured to store an address of the one memory cell of the storage device that will be instructed to execute the program, wherein the address of the one memory cell corresponds to a row/column location of the one memory cell in the array of the memory cells, the address storage is configured to set a flag corresponding to the address according to the address storing instruction, and the address storage is configured to clear the address and the flag according to the address clearing instruction, the flag indicates that the address of the one memory cell is still stored in the address storage;
   wherein when the main controller determines that the storage device is abnormally powered down during the execution of the program, and powered back on and rebooted after a period of time, the main controller reads the address storage, and when the main controller reads the address storage and finds that the flag is stored in the address storage, the main controller determines a particular one of the memory cells executed the program according to the address corresponding to the flag and instructs the storage control circuit to execute an error processing procedure on the particular one memory cell;
   wherein when the main controller determines that the storage device is abnormally powered down and finds that the address storage does not store the flag, the main controller determines that the storage device has completed the execution of the program when or before the storage device is abnormally powered down, and the main controller accordingly does not instruct the storage control circuit to execute the error processing procedure.

2. The system of claim 1, wherein the main controller outputs a power detecting signal to the storage control circuit;
   when the storage control circuit receives the power detecting signal indicating that the storage device was not abnormally powered down, the storage control circuit outputs a normal power signal to the main controller, when the storage control circuit receives the power detecting signal indicating that the storage device was abnormally powered down and then rebooted, the storage control circuit outputs an abnormal power signal to the main controller;
   when the main controller determines, based on the abnormal power signal, that the storage device is abnormally powered down during the execution of the program, the main controller instructs the storage control circuit to execute the error processing procedure on the one memory cell according to the abnormal power signal.

3. The system of claim 1, wherein the error processing procedure includes a program of instructing the storage control circuit to erase incomplete data stored in the one memory cell or a program of formatting the storage device by the main controller, and includes programs of providing update data to the storage control circuit by the main controller.

4. A method for processing the storage device by using the system of claim 1, wherein the storage device was abnormally powered down, and the method includes the following steps:
 (a) providing data to the storage control circuit by the main controller;
 (b) outputting the address storing instruction to the address storage from the main controller;
 (c) storing the address of the one memory cell of the storage device that will be instructed to execute the program according to the address storing instruction in the address storage;
 (d) using the main controller to output the programmable instruction to the storage control circuit to instruct, and using the storage control circuit, according to the programmable instruction, to control the one memory cell to execute the program that includes accessing the data;
 (e) using the main controller to determine whether the storage device was abnormally powered down or not when the storage device performs the program, in response to determining that the storage device was powered down, performing steps (f) to (g), in response to determining that the storage device was not powered down, completing the execution of the program by the one memory cell, and then performing steps (h) to (i);
 (f) using the main controller to obtain the address from the address storage and determine which one of the memory cells executed the program according to the address;
 (g) when the main controller determines that the storage device was powered back on and rebooted after a period of time, the main controller instructing the storage control circuit to execute the error processing procedure on the one memory cell, and then returning to perform the step (a) again;
 (h) using the main controller to output the address clearing instruction to the address storage after completing the execution of the program; and
 (i) clearing the address stored in the address storage according to the address clearing instruction.

5. The method of claim 4, further comprising steps of:
 outputting a power detecting signal to the storage control circuit from the main controller;
 using the storage control circuit to output a normal power signal to the main controller when the storage device is not abnormally powered down;
 using the storage control circuit to output an abnormal power signal to the main controller after the storage device is abnormally powered down and then back on; and
 using the main controller to determine whether the storage device was abnormally powered down during the execution of the program or not according to the normal power signal or the abnormal power signal by the main controller, and in response to determining that the storage device was abnormally powered down, determining a damage degree of the one memory cell according to the received abnormal power signal and performing the error processing procedure.

6. The method of claim 4, wherein the step of performing the error processing procedure includes:
 instructing the storage control circuit to erase incomplete data stored in the one memory cell or formatting the storage device by the main controller.

* * * * *